United States Patent
Shin et al.

(10) Patent No.: US 8,442,543 B2
(45) Date of Patent: May 14, 2013

(54) MOBILE STATION, BASE STATION, AND OPERATION METHOD OF MOBILE STATION

(75) Inventors: Won Jae Shin, Yongin-si (KR); Nam-Yoon Lee, Daejeon-si (KR); Chang Yong Shin, Seoul (KR); Kyung Hun Jang, Suwon-si (KR); Eun Seok Ko, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 12/755,324

(22) Filed: Apr. 6, 2010

(65) Prior Publication Data

US 2011/0009125 A1  Jan. 13, 2011

(30) Foreign Application Priority Data

Jul. 10, 2009 (KR) .......................... 10-2009-0062849

(51) Int. Cl.
*H04W 72/04* (2009.01)
(52) U.S. Cl.
USPC .......................... 455/452.1; 370/328; 370/380
(58) Field of Classification Search ............... 455/452.1; 370/328, 280
See application file for complete search history.

(56) References Cited

U.S. PATENT DOCUMENTS

| 2007/0115909 A1 | 5/2007 | Wang et al. | |
|---|---|---|---|
| 2007/0211813 A1 | 9/2007 | Talwar et al. | |
| 2010/0002607 A1* | 1/2010 | Kim et al. | 370/280 |
| 2010/0002643 A1* | 1/2010 | Han et al. | 370/329 |

FOREIGN PATENT DOCUMENTS

| KR | 10-2008-0084087 | 9/2008 |
|---|---|---|
| KR | 10-2008-0086726 | 9/2008 |
| KR | 10-2009-0008037 | 1/2009 |
| KR | 10-2009-0023879 | 3/2009 |

* cited by examiner

*Primary Examiner* — David Q Nguyen
(74) *Attorney, Agent, or Firm* — NSIP Law

(57) ABSTRACT

Provided are a mobile station that may determine a Precoding Matrix Index (PMI) of a serving channel, generate Channel State Information (CSI) based on only interference channels, and feed back the PMI and the CSI to a serving base station, a base station that may design a precoding vector based on the PMI and the CSI, and an operation of the mobile station. Also, provided are a mobile station that may determine a PMI based on only interference channels, generate CSI of a serving channel, and feed back the PMI and the CSI to a serving base station, a base station that may design a precoding vector based on the PMI and the CSI, and an operation method of the mobile station.

14 Claims, 6 Drawing Sheets

MOBILE STATION, BASE STATION, AND OPERATION METHOD OF MOBILE STATION

CROSS-REFERENCE TO RELATED APPLICATION(S)

This application claims the benefit under 35 U.S.C. §119(a) of Korean Patent Application No. 10-2009-0062849, filed Jul. 10, 2009, in the Korean Intellectual Property Office, the entire disclosure of which is incorporated herein by reference for all purposes.

BACKGROUND

1. Field

The following description relates to a technology for controlling inter-cell interference in a communication environment, and more particularly, to a technology for controlling inter-cell interference in a communication environment having a plurality of transmission/receiving ends with multiple antennas.

2. Description of the Related Art

A frequency higher than a carrier frequency, currently used in a current mobile communication system, may be used for obtaining a sufficient frequency resource in a next generation mobile communication system.

Since a cell coverage may be reduced in a next generation mobile communication system, a method for reducing an inter-cell distance has been provided to prevent the reduction of cell coverage.

When an inter-cell distance is reduced, however, users located in an edge of a cell may be affected by an interference signal transmitted from an adjacent cell. Accordingly, a Quality of Service ("QoS") of the users may not be guaranteed.

To address this issue, mobile communication standards such as the Institute of Electrical and Electronics Engineers ("IEEE") 802.16m and a Long Term Evolution ("LTE")-Advanced, have been developed. These standards are part of a $3^{rd}$ Generation Partnership Project ("3GPP"), a Coordinated Multi-point Transmission and Reception technology using coordination of multi nodes.

In particular, a coordinated beamforming technology, that may improve a performance of a user located in an edge of a cell by sharing interference channel and using feedback of interference channel information as opposed to a 'joint processing/transmission' technology that uses data exchange, is considered.

SUMMARY

In one general aspect, there is provided a mobile station. The mobile station includes a feedback unit configured to transmit first channel information based on a first reference signal and second channel information based on a second reference signal, the first channel information being associated with a first channel between a serving base station and the mobile station, the first reference signal being transmitted from the serving base station, the second channel information being associated with a second channel between the mobile station and a base station of an adjacent cell, and the second reference signal being transmitted from the base station of the adjacent cell.

The first channel information may be any one of Channel State Information ("CSI") and a Precoding Matrix Index ("PMI") of the first channel, and the second channel information may be any one of CSI and a PMI of the second channel.

The mobile station may further include a selection unit configured to select the first channel information and the second channel information as any one of the CSI and the PMI.

The selection unit may select the CSI as the first channel information, and select the PMI as the second channel information, when a backhaul delay is equal to or greater than a predetermined value.

The selection unit may select the CSI as the first channel information, and select the PMI as the second channel information, when a backhaul overhead is equal to or greater than a predetermined value.

The selection unit may select the CSI as the first channel information, and select the PMI as the second channel information, when a Signal to Noise Ratio ("SNR") is equal to or less than a predetermined value.

The feedback unit may feed back the first channel information to the serving base station, and feed back the second channel information to the base station of the adjacent cell.

The feedback unit may feed back the first channel information and the second channel information to the serving base station.

In another aspect, there is provided a mobile station including a first channel estimation unit configured to estimate a first channel between a serving base station and the mobile station based on a first reference signal transmitted from the serving base station. The mobile station also includes a second channel estimation unit configured to estimate a second channel between the mobile station and a base station of an adjacent cell based on a second reference signal transmitted from the base station of the adjacent cell, a PMI determination unit configured to determine a PMI based on the estimated first channel, and a feedback unit configured to feed back CSI and the PMI of the estimated second channel to at least one of the serving base station and the base station of the adjacent cell.

In yet another aspect, there is provided a mobile station including a first channel estimation unit configured to estimate a first channel between a serving base station and the mobile station based on a first reference signal transmitted from the serving base station, a second channel estimation unit configured to estimate a second channel between the mobile station and a base station of an adjacent cell based on a second reference signal transmitted from the base station of the adjacent cell, a PMI determination unit configured to determine a PMI based on the estimated second channel, and a feedback unit configured to feed back CSI and the PMI of the estimated first channel to at least one of the serving base station and the base station of the adjacent cell.

The serving base station may transmit the PMI to the base station of the adjacent cell.

The feedback unit may feed back the CSI to the serving base station, and feed back the PMI to the base station of the adjacent cell.

The PMI determination unit may include a computation unit configured to compute a null space of the estimated second channel and a PMI selection unit configured to select a PMI closest to the null space by referring to a codebook.

The PMI selection unit may select the PMI by referring to any one of a Rank-1 codebook and a Rank-2 codebook.

The serving base station may design a precoding vector based on the CSI and the PMI, and the PMI may be the closest to the null space with respect to an estimated channel between the serving base station and the mobile station, which belongs to the adjacent cell, in the codebook, the CSI being fed back from the mobile station, the PMI being determined by the mobile station which belongs to the adjacent cell.

The serving base station may design the precoding vector based on a channel capacity of the first channel.

The serving base station may design the precoding vector by referring to any one of a Rank-1 codebook and a Rank-2 codebook.

In yet still another aspect, there is provided a base station including, a CSI receiving unit configured to receive CSI of a first channel between the base station and a first mobile station from the first mobile station, the first mobile station being located in a cell where the base station belongs, a PMI receiving unit configured to receive a PMI which is determined by a second mobile station based on a second channel between the base station and the second mobile station, the second mobile station being located in an adjacent cell, and a precoder configured to design a precoding vector based on the CSI and the PMI.

The PMI receiving unit may receive the PMI from the second mobile station.

The base station may further include a reference signal transmission unit configured to transmit a reference signal to the first mobile station and the second mobile station. The first mobile station and the second mobile station may estimate the first channel and the second channel, respectively, based on the reference signal.

The second mobile station may compute a null space of the second channel, and select a PMI closest to the null space by referring to a codebook to feed back the PMI to a base station of the adjacent cell.

The second mobile station may select the PMI by referring to any one of a Rank-1 codebook and a Rank-2 codebook.

The precoder may design a precoding vector based on a channel capacity of the first channel.

The precoder may design the precoding vector by referring to any one of a Rank-1 codebook and a Rank-2 codebook.

In another aspect, there is provided an operation method of a mobile station. The method includes estimating a first channel between a serving base station and the mobile station based on a first reference signal transmitted from the serving base station, estimating a second channel between the mobile station and a base station of an adjacent cell based on a second reference signal transmitted from the base station of the adjacent cell, determining a PMI based on the estimated second channel, and feeding back CSI and the PMI of the estimated first channel to at least one of the serving base station and the base station of the adjacent cell.

The serving base station may transmit the PMI to the base station of the adjacent cell.

The determining of the PMI may include computing a null space of the estimated second channel, and selecting a PMI closest to the null space by referring to a codebook.

The serving base station may design a precoding vector to enable a channel capacity of the first channel to be maximum based on the CSI and the PMI, and the PMI may be the closest to a null space with respect to an estimated channel between the serving base station and the mobile station in the codebook, the CSI being fed back from the mobile station, the PMI being determined by the mobile station which belongs to the adjacent cell.

In still another aspect, there is provided a computer-readable recording medium storing a program for implementing an operation method of a mobile station, the method including estimating a first channel between a serving base station and the mobile station based on a first reference signal transmitted from the serving base station, estimating a second channel between the mobile station and a base station of an adjacent cell based on a second reference signal transmitted from the base station of the adjacent cell, determining a PMI based on the estimated second channel, feeding back CSI and the PMI of the estimated first channel to at least one of the serving base station and the base station of the adjacent cell.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
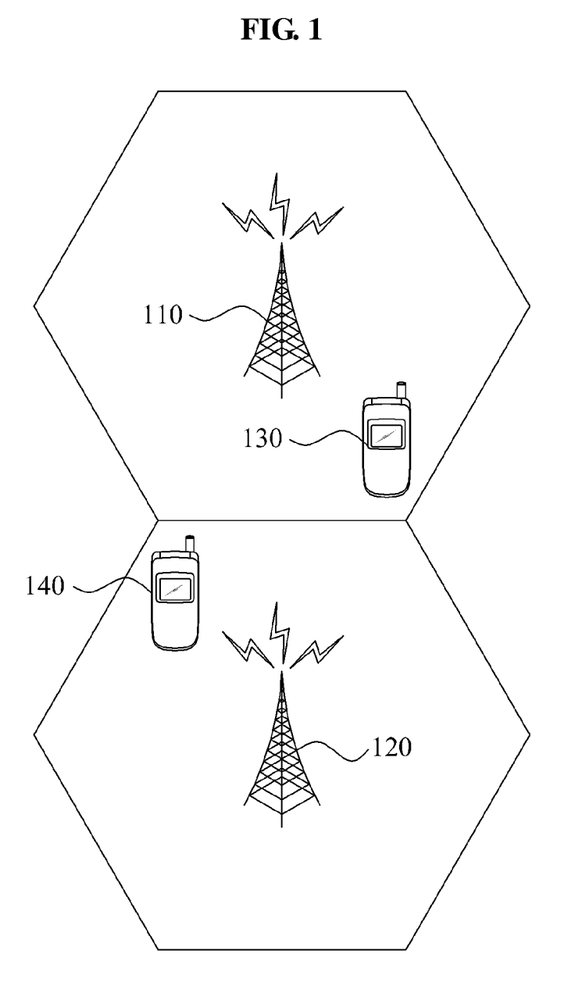
FIG. 1 is a diagram illustrating an example of a mobile communication system.

FIG. 1 illustrates an example of a mobile communication system.

It may be presumed, for example, that a serving base station ("BS") of a first mobile station ("MS(1)") 130 is a first base station ("BS(1)") 110, and a serving BS of a second mobile station ("MS(2)") 140 is a second base station ("BS (2)") 120.

A coordinated beamforming technology may be divided into two methods. First, in a coordinated multi-node method based on Channel State Information ("CSI"), a mobile station ("MS") may quantize a channel between a serving BS and the MS and an interference channel between the MS and an adjacent BS, and feed back direct channel information.

In the method, an adjacent BS may independently design a precoding vector using a variety of distribution algorithms, since each BS may include information about all interference channels in a communication system.

With reference to FIG. 1, the MS(1) 130 may estimate a channel, also referred to as a first channel, between the MS(1) 130 and the serving BS, that is, the BS(1) 110, and a channel, also referred to as a second channel, between the MS(1) 130 and the BS(2) 120 which is an adjacent BS. Also, the MS(1) 130 may feed back CSI of the first channel and the second channel to the BS(1) 110.

Also, the MS(2) 140 may estimate a channel, also referred to as a third channel, between the MS(2) 140 and the serving BS, that is, the BS(2) 120, and a channel, also referred to as a fourth channel, between the MS(2) 140 and the BS(1) 110 which is an adjacent BS. Also, the MS(2) 140 may feed back CSI of the third channel and the fourth channel to the BS(2) 120.

In this instance, the BS(1) 110 and the BS(2) 120 may design a precoding vector based on the CSI received from the MS(1) 130 and the MS(2) 140.

The method may generate a significant overhead in that information about a channel between a serving BS and an MS as well as information about a plurality of interference channels may be fed back.

Second, a method where an MS feeds back Precoding Matrix Index ("PMI") to a serving BS and an adjacent BS may exist.

That is, to control an inter-cell interference, the MS may feed back a PMI of the adjacent BS and a PMI of the serving BS maximizing a Signal to Interference plus Noise Ratio ("SINR") based on a channel between the serving BS and the MS and a channel between the adjacent BS and the MS.

In this instance, the serving BS may transmit the PMI of the adjacent BS to the adjacent BS using a backhaul such as an X2 interface, for example.

When describing the method with reference to FIG. 1, the MS(1) 130 may determine a PMI of the BS(1) 110, also referred to as a first PMI, and a PMI of the BS(2) 120, also referred to as a second PMI, to enable an SINR to be maximum, based on the first channel and the second channel. Also, the MS(1) 130 may feed back the first PMI and the second PMI to the BS(1) 110.

The MS(2) 140 may determine a PMI of the BS(2) 120, also referred to as a third PMI, and a PMI of the BS(1) 110, also referred to as a fourth PMI, to enable an SINR to be maximum, based on the third channel and the fourth channel.

In this instance, the BS(1) 110 may transmit the second PMI to the BS(2) 120, and the BS(2) 120 may transmit the fourth PMI to the BS(1) 110.

Also, the BS(1) 110 may design a precoding vector based on the first PMI and the fourth PMI, and the BS(2) 120 may design a precoding vector based on the second PMI and the third PMI.

In the method, the overhead may be reduced in comparison with the first method, in that a PMI as opposed to the CSI is fed back.

When the first PMI and the fourth PMI are identical and the second PMI and the third PMI are identical, the BS(1) 110 and the BS(2) 120 may design the precoding vector. When the first PMI and the fourth PMI are different from each other and the second PMI and the third PMI are different from each other, the BS(1) 110 and the BS(2) 120 may not easily design the precoding vector.

To address the above-described disadvantages, a method may be provided where an MS may determine a PMI set and feed back the PMI set to a BS. Here, the PMI set may enable an SINR of the MS to be equal to or greater than a predetermined threshold value.

When describing the method with reference to FIG. 1, the MS(1) 130 may determine a PMI set of the BS(1) 110, also referred to as a first PMI set, and a PMI of the BS(2) 120, also referred to as a second PMI set, to enable an SINR of the MS(1) 130 to be equal to or greater than a predetermined threshold value, based on the first channel and the second channel. Also, the MS(1) 130 may feed back the first PMI set and the second PMI set to the BS(1) 110.

The MS(2) 140 may determine a PMI set of the BS(2) 120, also referred to as a third PMI set, and a PMI of the BS(1) 110, also referred to as a fourth PMI set, to enable an SINR of the MS(2) 140 to be equal to or greater than a predetermined threshold value, based on the third channel and the fourth channel. Also, the MS(2) 140 may feed back the third PMI set and the fourth PMI set to the BS(2) 120.

In this instance, the BS(1) 110 may transmit the second PMI set to the BS(2) 120, and the BS(2) 120 may transmit the fourth PMI set to the BS(1) 110.

Also, the BS(1) 110 may compare the first PMI set and the fourth PMI set, and design a precoding vector based on a PMI which is commonly included in the first PMI set and the fourth PMI set.

Also, the BS(2) 120 may compare the second PMI set and the third PMI set, and design a precoding vector based on a PMI which is commonly included in the second PMI set and the third PMI set.

Accordingly, the BS(1) 110 and the BS(2) 120 may design the precoding vector more easily by designing based on the PMI commonly included in the PMI sets.

However, the method may generate an overhead in that an MS feeds back a PMI set. In particular, when a size of the PMI set is increased to increase a probability of the PMI commonly included in the PMI sets, a feedback overhead also may increase.

Accordingly, a method that may efficiently reduce interference, as well as a feedback overhead that may be generated in the first method and the second method, is sought.

According to an implementation, an MS determines a PMI based on only interference channels between adjacent BSs and the MS, generates CSI of a channel between a serving BS and the MS, and feeds back the PMI and the CSI to the serving BS. Accordingly, a feedback overhead may be reduced.

That is, the MS feeds back the CSI of the channel between the serving BS and the MS, and feeds back the PMI of a plurality of interference channels. Accordingly, an overhead, that may be generated since the MS feeds back the CSI of the channel between the serving BS and the MS, as well as CSI of the interference channels, may be reduced or prevented similar to the first method. Also, an overhead, that may be generated since the MS feeds back a PMI set, may be reduced or prevented similar to the second method.

Also, by feeding back the CSI of the channel between the serving BS and the MS, and feeding back the PMI of the interference channels, difficulty in designing a precoding vector due to uncommon PMI similar to the second method, may be prevented.

Hereinafter, the examples of embodiments are described with reference to FIG. 1.

The BS(1) 110 may transmit a reference signal, also referred to as a first reference signal, to the MS(1) 130 and the MS(2) 140.

The BS(2) 120 may transmit a reference signal, also referred to as a second reference signal, to the MS(1) 130 and the MS(2) 140.

The MS(1) 130 estimates the first channel based on the first reference signal, and the second channel based on the second reference signal.

Also, the MS(2) 140 may estimate the third channel based on the second reference signal, and the fourth channel based on the first reference signal.

The MS(1) 130 may determine a PMI, also referred to as a PMI A, based on the estimated second channel, and a PMI, also referred to as a PMI B, based on the estimated fourth channel.

In this instance, the MS(1) 130 may determine the PMI A to enable an interference signal, transmitted to the MS(1) 130 through the second channel, to be aligned in a null space of the second channel.

Also, the MS(2) 140 may determine the PMI B to enable an interference signal, transmitted to the MS(2) 140 through the fourth channel, to be aligned in a null space of the fourth channel.

When the PMI A is determined, the MS(1) 130 may feed back the PMI A and CSI of the estimated first channel, also referred to as CSI A, to the BS(1) 110.

Also, when the PMI B is determined, the MS(2) 140 may feed back the PMI B and CSI of the estimated third channel, referred to as CSI B, to the BS(2) 120.

In this instance, the BS(1) 110 may transmit the PMI A to the BS(2) 120, and BS(2) 120 may transmit the PMI B to the BS(1) 110.

According to another example, the MS(1) 130 may feed back the CSI A to the BS(1) 110, and directly transmit the PMI A to the BS(2) 120.

Also, the MS(2) 140 may feed back the CSI B to the BS(2) 120, and directly transmit the PMI B to the BS(1) 110.

That is, an MS may feed back both CSI of a serving channel and a PMI of an interference channel to a serving BS and the serving BS may transmit the PMI to an adjacent BS through an X2 interface, and the like. Also, the MS may feed back only the CSI of the serving channel to the serving BS, and directly transmit the PMI of the interference channel to the adjacent BS.

When an exchange of PMI is completed between the BS(1) 110 and the BS(2) 120, the BS(1) 110 may design a precoding vector, also referred to as a precoding vector A, based on the CSI A and the PMI B, and the BS(2) 120 may design a precoding vector, also referred to as a precoding vector B, based on the CSI B and the PMI A.

In this instance, the BS(1) 110 may design the precoding vector A to enable a channel capacity of the first channel to be maximum based on the CSI A and the PMI B, and to enable a signal transmitted through the fourth channel to be aligned in a null space of the fourth channel.

Also, the BS(2) 120 may design the precoding vector B to enable a channel capacity of the third channel to be maximum based on the CSI B and the PMI A, and to enable a signal transmitted through the second channel to be aligned in a null space of the second channel.

For convenience of description, a single interference channel for each MS has been described. However, it is understood that the communication system is not limited thereto, and that the teachings provided herein may be applied when a plurality of interference channels exists.

Hereinafter, examples of an operation where an MS determines a PMI and an operation where a BS designs a precoding vector are described.

Figure 2:
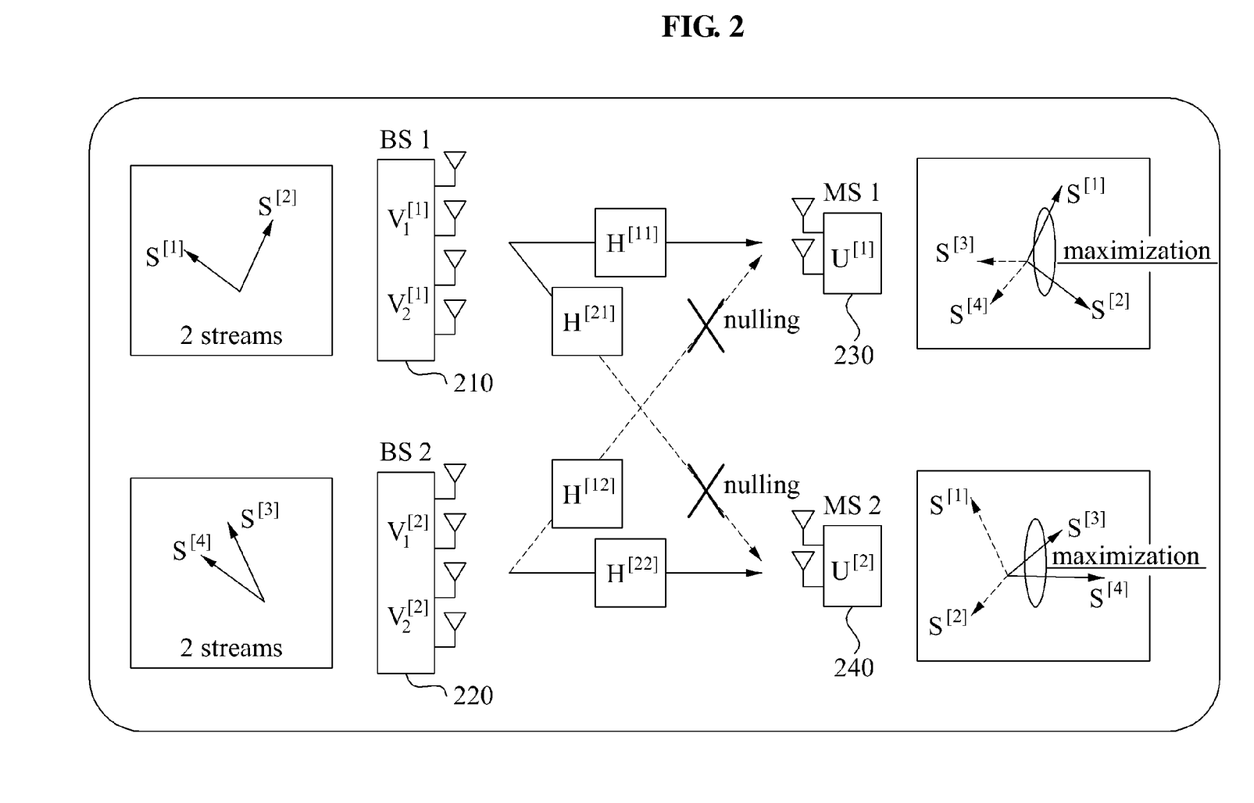
FIG. 2 is a diagram illustrating examples of operations of mobile stations and base stations.

FIG. 2 illustrates examples of operations of MSs and BSs. A BS(1) 210, a BS(2) 220, an MS(1) 230, and an MS(2) 240 are illustrated in FIG. 2. It may be presumed that the BS(1) 210 is a serving BS of the MS(1) 230, the BS(2) 220 is a serving BS of the MS(2) 240, the MS(1) 230 interferes with the BS(2) 220, and the MS(2) 240 is interfered with the BS(1) 210. Also, it may be presumed that each of the BS(1) 210 and the BS(2) 220 has four antennas, and each of the MS(1) 230 and the MS(2) 240 has two antennas, for convenience of description.

In FIG. 2, $H^{[ij]}$ may denote a channel between an $i^{th}$ MS and a $j^{th}$ BS.

Also, $S^{[1]}$ and $S^{[2]}$ may denote two independent streams to be transmitted by the BS(1) 210 to the MS(1) 230. $S^{[3]}$ and $S^{[4]}$ may denote two independent streams to be transmitted by the BS(2) 220 to the MS(2) 240.

Also, $V_j^{[i]}$ may denote a precoding vector used when an $i^{th}$ BS transmits a $j^{th}$ stream.

The BS(1) 210 and the BS(2) 220 may design the precoding vector to enable a channel capacity of each serving channel to be maximum and to enable a signal, which is transmitted through an interference channel, to be aligned in a null space of the interference channel.

Accordingly, the BS(1) 210 and the BS(2) 220 may design the precoding vector according to Equation 1 and Equation 2.

$$H^{[21]}[\ v_1^{[1]}\ \ v_2^{[1]}\ ] = 0\ \&\ H^{[12]}[\ v_1^{[2]}\ \ v_2^{[2]}\ ] = 0 \quad \text{[Equation 1]}$$

$$\operatorname*{argmax}_{v_i^{[1]}, i=1,2} \sum_{i=1}^{2} \|H^{[11]}v_i^{[1]}\|^2\ \&\ \operatorname*{argmax}_{v_i^{[2]}, i=1,2} \|H^{[22]}v_i^{[2]}\|^2 \quad \text{[Equation 2]}$$

That is, the BS(1) 210 may design $V_1^{[1]}$ and $V_2^{[1]}$ to enable a signal transmitted to the MS(2) 240 through $H^{[21]}$ to be aligned in a null space of $H^{[21]}$, according to Equation 1, and to enable a channel capacity of $H^{[11]}$ to be maximum according to Equation 2.

Also, the BS(2) 220 may design $V_1^{[2]}$ and $V_2^{[2]}$ to enable a signal transmitted to the MS(2) 240 through $H^{[12]}$ to be aligned in a null space of $H^{[12]}$, according to Equation 1, and to enable a channel capacity of $H^{[22]}$ to be maximum according to Equation 2.

Hereinafter, an operation where the BS(1) 210 designs a precoding vector is further described.

When the BS(1) 210 transmits a reference signal to the MS(1) 230 and the MS(2) 240, the MS(2) 240 estimates $H^{[21]}$ based on the reference signal, and compute the null space of $H^{[21]}$.

In this instance, the MS(2) 240 may compute the null space of $H^{[21]}$ according to Equation 3.

$$Q_N^{[21]} = [\ q_{N,1}^{[21]}\ \ q_{N,2}^{[21]}\ ] \quad \text{[Equation 3]}$$

$$\text{where } H^{[21]} = U^{[21]} \begin{bmatrix} \sum_{2\times 2}^{[21]} & 0_{2\times 2} \\ 0_{2\times 2} & 0_{2\times 2} \end{bmatrix} [\ Q_C^{[21]}\ \ Q_N^{[21]}\ ]^H$$

When the null space of $H^{[21]}$ is obtained, the MS(2) 240 may select a PMI closest to the null space of $H^{[21]}$ by referring to a codebook.

In this instance, the MS(2) 240 may select two PMIs closest to the null space of $H^{[21]}$ by referring to a Rank-1 codebook according to Equation 4.

$$\operatorname*{argmin}_{\hat{q}_{N,1}^{[21]} \in C} \left\| [\ q_{N,1}^{[21]}\ \ q_{N,2}^{[21]}\ ] \begin{bmatrix} \alpha_1^1 \\ \alpha_2^1 \end{bmatrix} - \hat{q}_{N,1}^{[21]} \right\|^2, \quad \text{[Equation 4]}$$

$$\operatorname*{argmin}_{\hat{q}_{N,2}^{[21]} \in C - \hat{q}_{N,1}^{[21]}} \left\| [\ q_{N,1}^{[21]}\ \ q_{N,2}^{[21]}\ ] \begin{bmatrix} \alpha_1^2 \\ \alpha_2^2 \end{bmatrix} - \hat{q}_{N,2}^{[21]} \right\|^2$$

where C may denote a Rank-1 codebook matrix, and $\alpha_i^j$ may denote a random complex number.

According to another example, the MS(2) 240 may select a single PMI closest to the null space of $H^{[21]}$ by referring to a Rank-2 codebook according to Equation 5.

$$\operatorname*{argmin}_{[\hat{q}_{N,1}^{[21]}\hat{q}_{N,2}^{[21]}]\in C_{R2}} \left\| [\, q_{N,1}^{[21]} \quad q_{N,2}^{[21]} \,] \begin{bmatrix} \alpha_1^1 \\ \alpha_2^1 \end{bmatrix} - \hat{q}_{N,1}^{[21]} \right\|^2 +$$

$$\left\| [\, q_{N,1}^{[21]} \quad q_{N,2}^{[21]} \,] \begin{bmatrix} \alpha_1^2 \\ \alpha_2^2 \end{bmatrix} - \hat{q}_{N,2}^{[21]} \right\|^2$$

[Equation 5]

where $C_{R2}$ may denote a Rank-2 codebook matrix, and may $\alpha_i^j$ may denote a random complex number.

In this instance, the MS(2) 240 may use a Least Squares (LS) algorithm or a modified LS algorithm that retrieves a vector closest to a given vector from vectors located in a particular space, in order to select the PMI. When the PMI is completely selected, the MS(2) 240 may transmit the PMI to the BS(2) 220. In this instance, the BS(2) 220 may transmit the PMI to the BS(1) 210.

According to another example, the MS(2) 240 may directly transmit the PMI to the BS(1) 210.

The MS(1) 230 estimates $H^{[11]}$ based on the reference signal received from the BS(1) 210, and feed back CSI of $H^{[11]}$ to the BS(1) 210.

When the PMI and the CSI are received, the BS(1) 210 may design a precoding vector based on the PMI and the CSI.

In this instance, the BS(1) 210 may design $V_1^{[1]}$ and $V_2^{[1]}$ satisfying Equation 6.

$$\operatorname*{argmax}_{v_i^{[1]}, i=1,2} \sum_{i=1}^{2} \|H^{[11]} v_i^{[1]}\|^2 = \operatorname*{argmax}_{(\alpha_1^i, \alpha_2^i), i=1,2} \sum_{i=1}^{2} \left\| H^{[11]} \underbrace{[\, \hat{q}_{N,1}^{[21]} \quad \hat{q}_{N,2}^{[21]} \,]}_{\tilde{H}^{[11]}} \begin{bmatrix} \alpha_1^i \\ \alpha_2^i \end{bmatrix} \right\|^2$$

$$= \operatorname*{argmax}_{(\alpha_1^i, \alpha_2^i), i=1,2} \sum_{i=1}^{2} \left\| \tilde{H}^{[11]} \begin{bmatrix} \alpha_1^i \\ \alpha_2^i \end{bmatrix} \right\|^2$$

[Equation 6]

That is, the BS(1) 210 may design $V_1^{[1]}$ and $V_2^{[1]}$ to enable the channel capacity of $H^{[11]}$ to be maximum, and to enable a signal transmitted through $H^{[21]}$ to be aligned in the null space of $H^{[21]}$.

In this instance, the BS(1) 210 may compute $V_1^{[1]}$ and $V_2^{[1]}$ using a closed-form solution, according to Equation 7.

$$v_i^{[11]} = [\, \hat{q}_{N,1}^{[21]} \quad \hat{q}_{N,2}^{[21]} \,] \cdot \begin{bmatrix} \alpha_1^i \\ \alpha_2^i \end{bmatrix}$$

[Equation 7]

where $\begin{bmatrix} \alpha_1^i \\ \alpha_2^i \end{bmatrix} = \tilde{v}_{C,i}^{[11]}, i=1, 2, \tilde{v}_C^{[11]} = [\, \tilde{v}_{C,1}^{[11]} \quad \tilde{v}_{C,2}^{[11]} \,]$, and $\tilde{H}^{[11]} = \tilde{U}^{[11]} \begin{bmatrix} \tilde{\Sigma}_{2\times2}^{[11]} & 0_{2\times2} \\ 0_{2\times2} & 0_{2\times2} \end{bmatrix} [\, \tilde{V}_C^{[11]} \quad \tilde{V}_N^{[11]} \,]^H$ The BS(1) 210 may use $V_1^{[1]}$ and $V_2^{[1]}$, computed according to Equation 7, as the precoding vector.

According to another example, however, the BS(1) 210 may select a PMI closest to $V_1^{[1]}$ and $V_2^{[1]}$ computed according to Equation 7 by referring to the Rank-1 codebook, and use the selected PMI as the precoding vector according to Equation 8.

$$\operatorname*{argmin}_{\hat{v}_1^{[11]} \in C} \|v_1^{[11]} - \hat{v}_1^{[11]}\|^2 \& \operatorname*{argmin}_{\hat{v}_2^{[11]} \in C} \|v_2^{[11]} - \hat{v}_2^{[11]}\|^2$$

[Equation 8]

where C may denote the Rank-1 codebook matrix.

According to still another example, the BS(1) 210 may select a PMI closest to $V_1^{[1]}$ and $V_2^{[1]}$ computed according to Equation 7 by referring to the Rank-2 codebook, and use the selected PMI as the precoding vector according to Equation 9.

$$\operatorname*{argmin}_{[\hat{v}_1^{[11]} \hat{v}_2^{[11]}] \in C_{R2}} \|v_1^{[11]} - \hat{v}_1^{[11]}\|^2 + \|v_2^{[11]} - \hat{v}_2^{[11]}\|^2$$

[Equation 9]

where $C_{R2}$ may denote the Rank-1 codebook matrix.

Examples of operations of designing the precoding vector in the BS(1) 210 have been described. Since an operation of designing a precoding vector in the BS(2) 220 is similar to the above-described operation, further description is omitted herein for conciseness.

An operation of designing a precoding vector according to still another example is described below with reference to FIG. 2.

When the BS(1) 210 transmits a reference signal to the MS(1) 230 and the MS(2) 240, the MS(2) 240 estimates $H^{[21]}$ based on the reference signal, and feeds back CSI of $H^{[21]}$ to the BS(2) 220.

In this instance, the BS(2) 220 may transmit a PMI to the BS(1) 210. According to another example, the MS(2) 240 may directly transmit the PMI to the BS(1) 210.

The MS(1) 230 estimates $H^{[11]}$ based on the reference signal received from the BS(1) 210, selects a precoding vector of $H^{[11]}$, as described below, and feeds back the precoding vector to the BS(1) 210.

The MS(1) 230 may select a PMI that may maximize a channel capacity of a serving cell. For this, the MS(1) 230 may perform a singular value decomposition with respect to $H^{[11]}$ according to Equation 10.

$$V_C^{[11]} = [\, v_{C,1}^{[11]} \quad v_{C,2}^{[11]} \,]$$

[Equation 10]

where $H^{[11]} = U^{[11]} \begin{bmatrix} \Sigma_{2\times2}^{[11]} & 0_{2\times2} \\ 0_{2\times2} & 0_{2\times2} \end{bmatrix} [\, V_C^{[11]} \quad V_N^{[11]} \,]^H$ The MS(1) 230 may select a PMI set closest to the computed $V_1^{[11]}$ and $V_2^{[11]}$, and feed back the PMI set to the serving cell. When selecting the closest PMI set, the MS(1) 230 may select a single closest PMI in a Rank-1 codebook, and also select a PMI closest to a null space in a Rank-2 codebook.

The BS(1) 210 may design the precoding vector based on the PMI and the CSI, when receiving the PMI and the CSI.

In this instance, the BS(1) 210 may design $V_1^{[1]}$ and $V_2^{[1]}$ satisfying Equation 11 given as below. The BS(1) 210 where the CSI is fed back may retrieve a null space of a channel interfering with an adjacent MS, and may perform precoding with respect to the precoding vector corresponding to the PMI as a vector which is projected to the null space, which may be obtained using a modified LS.

$$v_i^{[11]} = Q_N^{[21]}\left(Q_N^{[21]H} Q_N^{[21]}\right)^{-1} Q_N^{[21]H} v_{C,i}^{[11]} \quad \text{[Equation 11]}$$

where $i = 1, 2$, $Q_N^{[21]} = [\, q_{N,1}^{[21]} \;\; q_{N,2}^{[21]} \,]$ and $H^{[21]} = U^{[21]} \begin{bmatrix} \sum_{2\times 2}^{[21]} & 0_{2\times 2} \\ 0_{2\times 2} & 0_{2\times 2} \end{bmatrix} [\, Q_C^{[21]} \;\; Q_N^{[21]} \,]^H$ The BS(1) 210 may use $V_1^{[1]}$ and $V_2^{[1]}$, computed according to Equation 11, as the precoding vector. According to another example, the BS(1) 210 may select a PMI closest to $V_1^{[1]}$ and $V_2^{[1]}$ computed according to Equation 11 by referring to the Rank-1 codebook, and use the selected PMI as the precoding vector according to Equation 12.

$$\operatorname*{argmin}_{\hat{v}_1^{[11]} \in C} \|v_1^{[11]} - \hat{v}_1^{[11]}\|^2 \; \& \operatorname*{argmin}_{\hat{v}_2^{[11]} \in C} \|v_2^{[11]} - \hat{v}_2^{[11]}\|^2 \quad \text{[Equation 12]}$$

where C may denote the Rank-1 codebook matrix.

According to still another example, the BS(1) 210 may select a PMI closest to $V_1^{[1]}$ and $V_2^{[1]}$ computed according to Equation 11 by referring to the Rank-2 codebook, and use the selected PMI as the precoding vector according to Equation 13.

$$\operatorname*{argmin}_{[\hat{v}_1^{[11]} \hat{v}_2^{[11]}] \in C_{R2}} \|v_1^{[11]} - \hat{v}_1^{[11]}\|^2 + \|v_2^{[11]} - \hat{v}_2^{[11]}\|^2 \quad \text{[Equation 13]}$$

where $C_{R2}$ may denote the Rank-1 codebook matrix.

Examples of operations of designing the precoding vector in the BS(1) 210 has been described. Since an operation of designing a precoding vector in the BS(2) 220 is similar to the above-described operation, further description is omitted herein for conciseness.

The operations of designing the precoding vector using a partial CSI/PMI feedback have been described with reference to FIGS. 1 and 2.

The two example methods described above in FIG. 1 may be selected according to an environment using the operations of designing the precoding vector using a partial CSI/PMI feedback. A selection unit to select the method may be included in an MS. Also, a CSI(adjacent)/PMI(serving) and PMI(adjacent)/CSI(serving)-based feedback and algorithm may be applied according to a criterion described below. However, the criterion is only one example, and it is apparent to those skilled in the related art that a variety of criteria may be applied.

(1) Backhaul delay: In general, a CSI feedback may be sensitive to a channel feedback delay. Accordingly, when a backhaul delay is significant when adjacent channel information is provided, the PMI(adjacent)/CSI(serving)-based scheme may be efficient.

(2) Backhaul overhead: When a number of interferences from an adjacent cell is significant, information about all interference channels may not be transmitted to CSI. Accordingly, when a backhaul overhead is significant, PMI(adjacent)/CSI(serving)-based scheme may be efficient.

(3) Signal to Noise Ratio ("SNR"): A scheme that may recognize an interference as a noise in an area with a low SNR, based on only serving channel, exists. Accordingly, it may be efficient that information about an adjacent channel is provided to a PMI, and information about a serving channel is provided to CSI.

Hereinafter, operations of the BS(1) 210, the BS(2) 220, the MS(1) 230, and the MS(2) 240 are described with reference to FIG. 3.

Figure 3:
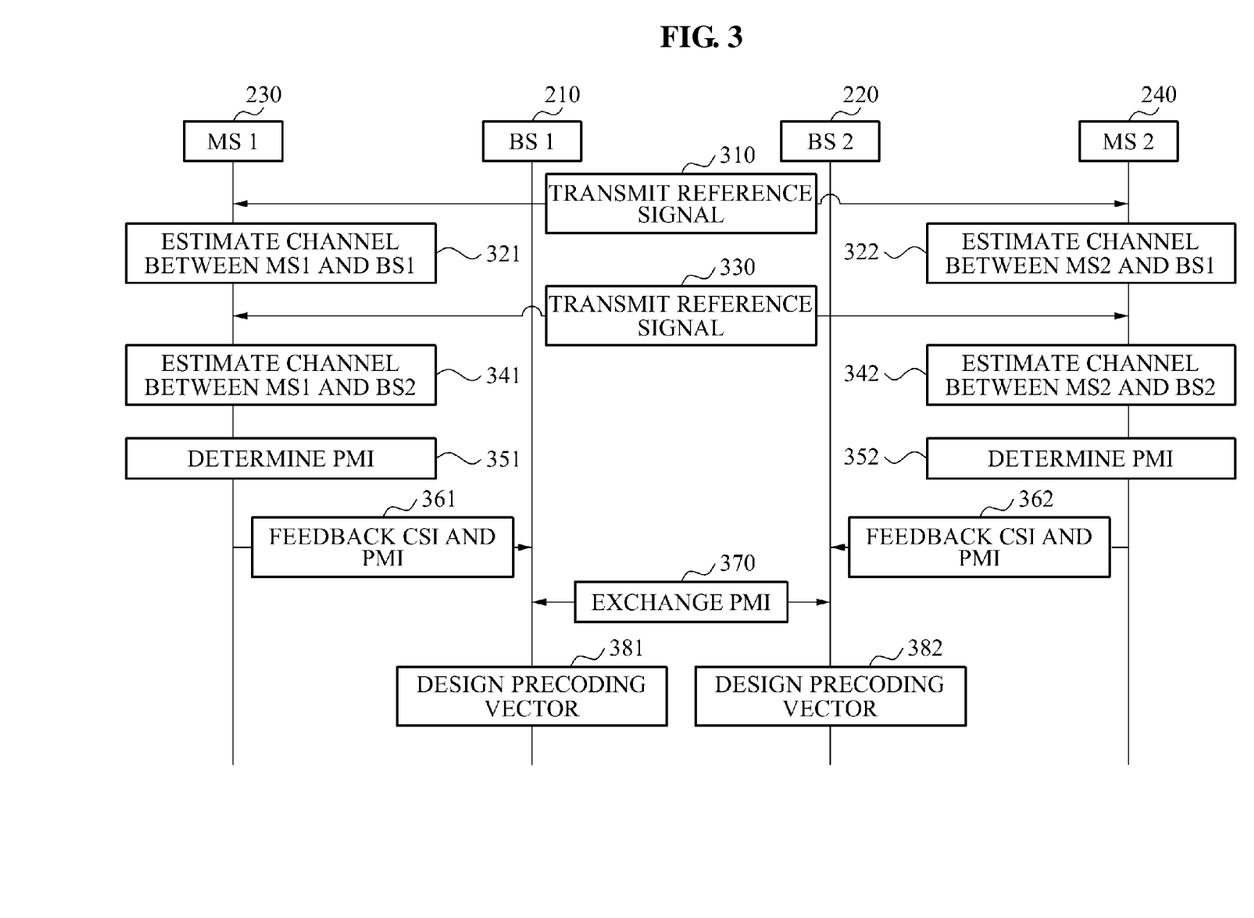
FIG. 3 is a flowchart illustrating an example of an operation method of a mobile station and a base station.

FIG. 3 illustrates an example of an operation method of MSs 230 and 240 and BSs 210 and 220.

In operation 310, the BS(1) 210 transmits a reference signal to the MS(1) 230 and the MS(2) 240.

In operation 321, the MS(1) 230 estimates a channel $H^{[11]}$ between the MS(1) 230 and the BS(1) 210 based on the reference signal transmitted from the BS(1) 210. In operation 322, the MS(2) 240 estimates a channel $H^{[21]}$ between the MS(2) 240 and the BS(1) 210 based on the reference signal transmitted from the BS(1) 210.

In operation 330, the BS(2) 220 transmits a reference signal to the MS(1) 230 and the MS(2) 240.

In operation 341, the MS(1) 230 estimates a channel $H^{[12]}$ between the MS(1) 230 and the BS(2) 220 based on the reference signal transmitted from the BS(2) 220. In operation 342, the MS(2) 240 estimates a channel $H^{[22]}$ between the MS(2) 240 and the BS(2) 220 based on the reference signal transmitted from the BS(2) 220.

In operation 351, the MS(1) 230 determines a PMI based on the channel $H^{[12]}$ between the MS(1) 230 and the BS(2) 220. In operation 352, the MS(2) 240 determines a PMI based on the channel $H^{[21]}$ between the MS(2) 240 and the BS(1) 210.

In operation 361, the MS(1) 230 feeds back the PMI, determined in operation 351, and CSI of the channel $H^{[11]}$ between the MS(1) 230 and the BS(1) 210, to the BS(1) 210. In operation 362, the MS(2) 240 feeds back the PMI, determined in operation 352, and CSI of the channel $H^{[22]}$ between the MS(2) 240 and the BS(2) 220, to the BS(2) 220.

In operation 370, the BS(1) 210 and the BS(2) 220 exchange the PMIs, received from the MS(1) 230 and the MS(2) 240, respectively.

In operation 381, the BS(1) 210 designs a precoding vector based on the CSI of the channel $H^{[11]}$ between the MS(1) 230 and the BS(1) 210, and the PMI determined by the MS(2) 240. In operation 382, the BS(2) 220 designs a precoding vector based on the CSI of the channel $H^{[22]}$ between the MS(2) 240 and the BS(2) 220, and the PMI determined by the MS(1) 230.

Hereinafter, an example of a configuration of an MS and a BS, and an example of an operation method of the MS are described with reference to FIGS. 4 through 6.

Figure 4:
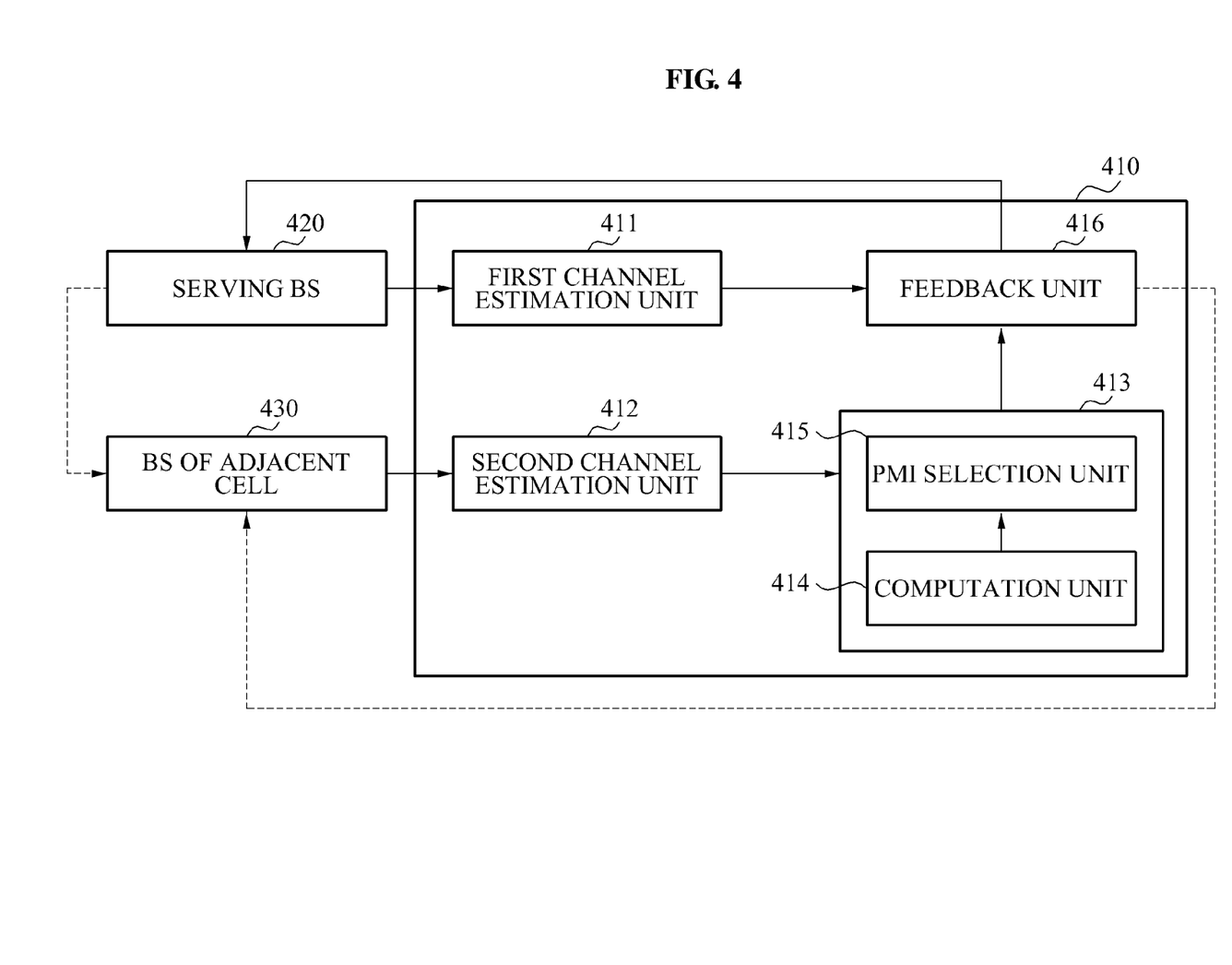
FIG. 4 illustrates an example of a configuration of a mobile station.

FIG. 4 illustrates an example of a configuration of an MS 410.

The MS 410, a serving BS 420, and a BS 430 of an adjacent cell are illustrated in FIG. 4.

The MS 410 includes a first channel estimation unit 411, a second channel estimation unit 412, a PMI determination unit 413, and a feedback unit 416.

The first channel estimation unit 411 estimates a first channel between the serving BS 420 and the MS 410 based on a first reference signal transmitted from the serving BS 420.

The second channel estimation unit 412 estimates a second channel between the MS 410 and the BS 430 of the adjacent cell based on a second reference signal transmitted from the BS 430 of the adjacent cell.

The PMI determination unit 413 determines a PMI based on the estimated first channel.

In this instance, the PMI determination unit 413 may include a computation unit 413 and a PMI selection unit 415.

The computation unit 414 may compute a null space of the estimated second channel.

Here, the computation unit 414 may compute the null space of the estimated second channel using Equation 3.

The PMI selection unit 415 may select a PMI closest to the null space by referring to a codebook.

In this instance, the PMI selection unit 415 may select the PMI by referring to any one of a Rank-1 codebook and a Rank-2 codebook.

The PMI selection unit 415 may select the PMI using Equation 4 when referring to the Rank-1 codebook, and select the PMI using Equation 5 when referring to the Rank-2 codebook.

The feedback unit 416 feeds back CSI and the PMI of the estimated first channel to the serving BS 420.

Here, the serving BS 420 may transmit the PMI to the BS 430 of the adjacent cell.

According to another example, the feedback unit 416 feeds back only the CSI to the serving BS 420, and directly transmits the PMI to the BS 430 of the adjacent cell.

According to an example, the serving BS 420 may design a precoding vector based on the CSI, fed back from the MS 410, and the PMI determined by an MS which belongs to an adjacent cell.

In this instance, the PMI, determined by the MS which belongs to the adjacent cell, may be closest to a null space of an estimated channel between the serving BS 420 and the MS which belongs to the adjacent cell.

Also, the serving BS 420 may design the precoding vector to enable a channel capacity of the first channel to be maximum.

Also, the serving BS 420 may design the precoding vector using Equation 6 and Equation 7.

In this instance, the serving BS 420 may design the precoding vector by referring to any one of the Rank-1 codebook and the Rank-2 codebook.

Also, the serving BS 420 may design the precoding vector using Equation 8, when referring to the Rank-1 codebook, and design the precoding vector using Equation 9, when referring to the Rank-2 codebook.

Figure 5:
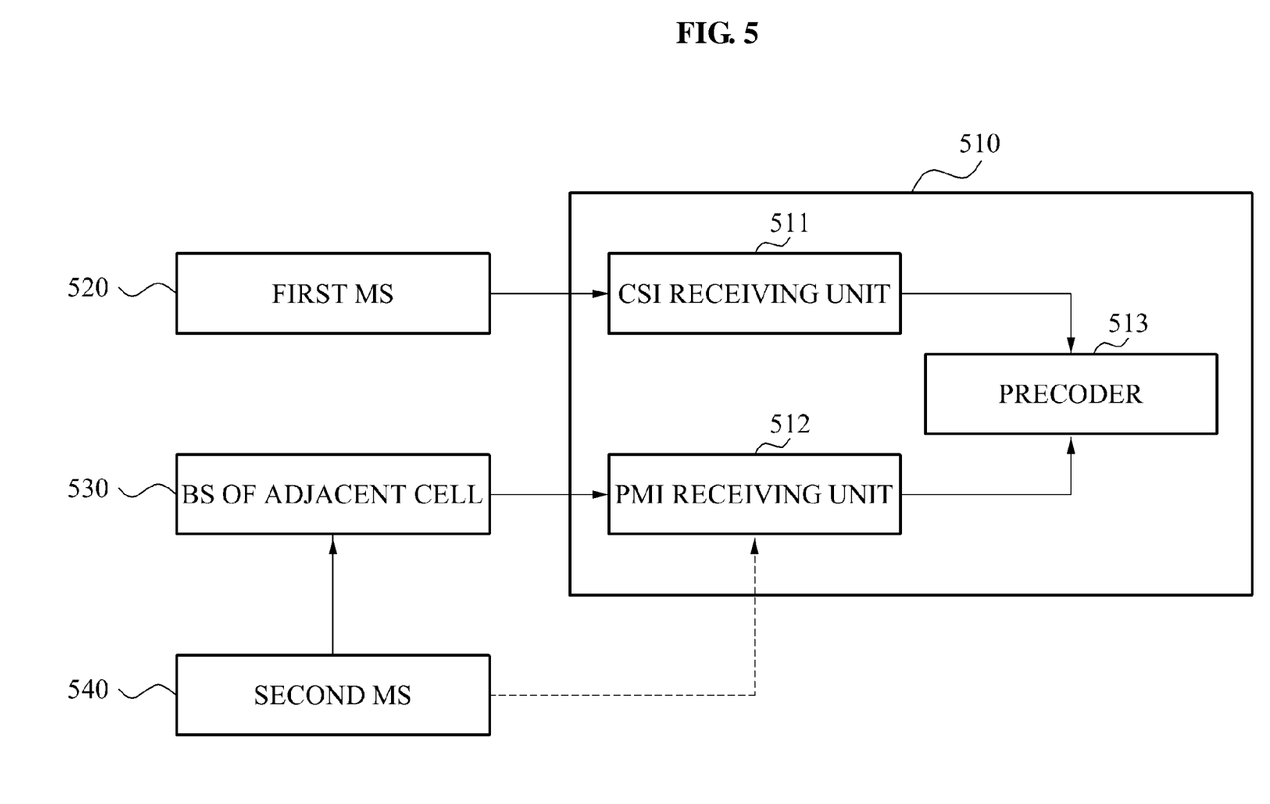
FIG. 5 illustrates an example of a configuration of a base station.

FIG. 5 illustrates an example of a configuration of a BS 510.

The BS 510, a first MS 520, a BS 530 of an adjacent cell, and a second MS 540 are illustrated in FIG. 5.

The BS 510 includes a CSI receiving unit 511, a PMI receiving unit 512, and a precoder 513.

The CSI receiving unit 511 receives CSI of a first channel between the BS 510 and the first MS 520 from the first MS 520. The first MS 520 may be located in a cell where the BS 510 belongs.

The PMI receiving unit 512 receives a PMI which is determined by the second MS 540 based on a second channel between the BS 510 and the second MS 540. The second MS may be located in an adjacent cell.

Here, the second MS 540 may compute a null space of the second channel, select a PMI closest to the null space by referring to a codebook, and thereby may feed back the PMI to the BS 530 of the adjacent cell.

The second MS 540 may compute the null space using Equation 3.

Also, the second MS 540 may select the PMI by referring to any one of a Rank-1 codebook and a Rank-2 codebook.

Also, the second MS 540 may select the PMI using Equation 4 when referring to the Rank-1 codebook, and select the PMI using Equation 5 when referring to the Rank-2 codebook.

According to another example, the PMI receiving unit 512 may directly receive the PMI from the second MS 540.

According to an example, the BS 510 may further include a reference signal transmission unit (not shown).

The reference signal transmission unit may transmit a reference signal to the first MS 520 and the second MS 540.

In this instance, the first MS 520 and the second MS 540 may estimate the first channel and the second channel based on the reference signal.

The precoder 513 may design a precoding vector based on the CSI and the PMI.

According to an example, the precoder 513 may design the precoding vector to enable a channel capacity of the first channel to be maximum.

Also, the precoder 513 may design the precoding vector using Equation 6 and Equation 7.

In this instance, the precoder 513 may design the precoding vector by referring to any one of the Rank-1 codebook and the Rank-2 codebook.

The precoder 513 may design the precoding vector using Equation 8 when referring to the Rank-1 codebook, and design the precoding vector using Equation 9 when referring to the Rank-2 codebook.

Figure 6:
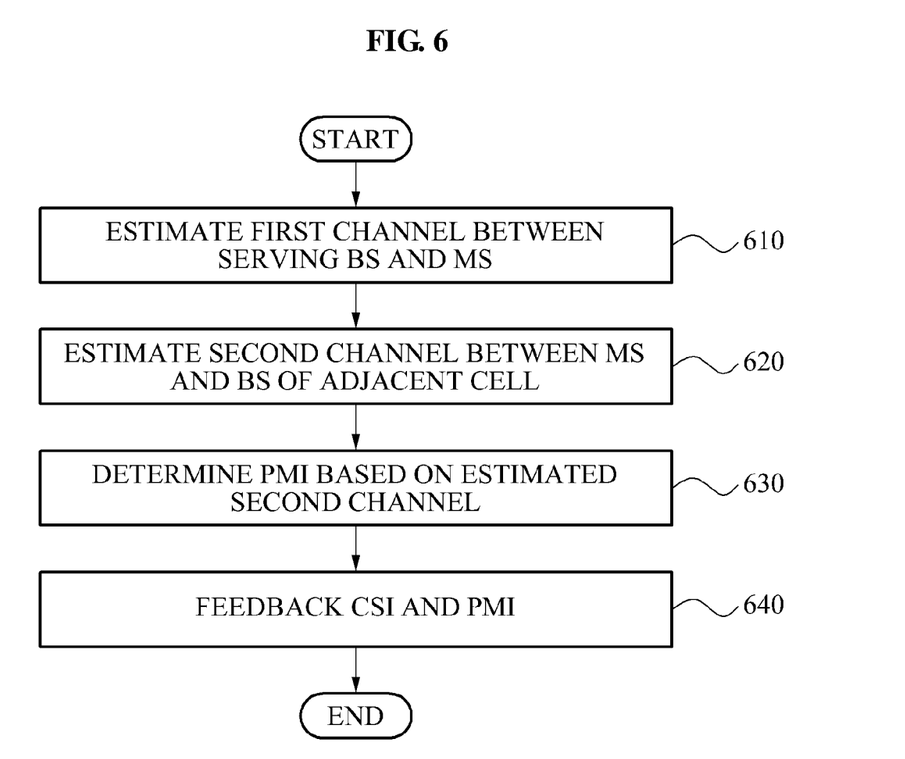
FIG. 6 is a flowchart illustrating an example of an operation method of a mobile station.

FIG. 6 illustrates an example of an operation method of an MS.

In operation 610, a first channel between a serving BS and the MS is estimated based on a first reference signal transmitted from the serving BS.

In operation 620, a second channel between the MS and a BS of an adjacent cell is estimated based on a second reference signal transmitted from the BS of the adjacent cell.

In operation 630, a PMI is determined based on the estimated second channel.

According to an example of an embodiment, the determining in operation 630 may include an operation of computing a null space of the estimated second channel.

Also, the determining in operation 630 may further include an operation of selecting a PMI closest to the null space by referring to a codebook.

In operation 640, the PMI and CSI of the estimated first channel may be fed back to the serving BS.

In this instance, the serving BS may transmit the PMI to the BS of the adjacent cell.

According to an example, the serving BS may design a precoding vector to enable a channel capacity of the first channel to be maximum based on the CSI and the PMI. Here, the CSI may be fed back from the MS, and the PMI may be determined by the MS which belongs to the adjacent cell.

In this instance, the PMI is the closest to a null space of an estimated channel between the serving BS and the MS in the codebook.

According to examples of embodiments, an MS may determine a PMI based on only interference channels between the MS and adjacent BSs, generate CSI of a channel between the MS and a serving BS, and feed back the PMI and the CSI to the serving BS. Accordingly, a feedback overhead may be reduced.

The processes, functions, methods and software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media may include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer system connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile station, comprising:
    a first channel estimation unit configured to estimate a first channel between a serving base station and the mobile station based on a first reference signal transmitted from the serving base station;
    a second channel estimation unit configured to estimate a second channel between the mobile station and a base station of an adjacent cell based on a second reference signal transmitted from the base station of the adjacent cell;
    a PMI determination unit configured to determine a PMI based on the estimated first channel; and
    a feedback unit configured to feed back CSI and the PMI of the estimated second channel to at least one of the serving base station and the base station of the adjacent cell.

2. A mobile station, comprising:
    a first channel estimation unit configured to estimate a first channel between a serving base station and the mobile station based on a first reference signal transmitted from the serving base station;
    a second channel estimation unit configured to estimate a second channel between the mobile station and a base station of an adjacent cell based on a second reference signal transmitted from the base station of the adjacent cell;
    a PMI determination unit configured to determine a PMI based on the estimated second channel; and
    a feedback unit configured to feed back CSI and the PMI of the estimated first channel to at least one of the serving base station and the base station of the adjacent cell.

3. The mobile station of claim 2, wherein the serving base station is configured to transmit the PMI to the base station of the adjacent cell.

4. The mobile station of claim 2, wherein the feedback unit is further configured to:
    feed back the CSI to the serving base station; and
    feed back the PMI to the base station of the adjacent cell.

5. The mobile station of claim 2, wherein the PMI determination unit comprises:
    a computation unit configured to compute a null space of the estimated second channel; and
    a PMI selection unit configured to select a PMI closest to the null space by referring to a codebook.

6. The mobile station of claim 5, wherein the PMI selection unit is further configured to select the PMI by referring to any one of a Rank-1 codebook and a Rank-2 codebook.

7. The mobile station of claim 5, wherein the serving base station is configured to design a precoding vector based on the CSI and the PMI, the PMI being the closest to the null space with respect to an estimated channel between the serving base station and the mobile station, the mobile station belonging to the adjacent cell, in the codebook, the CSI being fed back from the mobile station, the PMI being determined by the mobile station, the mobile station belonging to the adjacent cell.

8. The mobile station of claim 7, wherein the serving base station is further configured to design the precoding vector based on a channel capacity of the first channel.

9. The mobile station of claim 8, wherein the serving base station is further configured to design the precoding vector by referring to any one of a Rank-1 codebook and a Rank-2 codebook.

10. An operation method of a mobile station, the method comprising:
    estimating a first channel between a serving base station and the mobile station based on a first reference signal transmitted from the serving base station;
    estimating a second channel between the mobile station and a base station of an adjacent cell based on a second reference signal transmitted from the base station of the adjacent cell;
    determining a PMI based on the estimated second channel; and
    feeding back CSI and the PMI of the estimated first channel to at least one of the serving base station and the base station of the adjacent cell.

11. The operation method of claim 10, further comprising:
    transmitting from the serving base station the PMI to the base station of the adjacent cell.

12. The operation method of claim 10, wherein the determining of the PMI comprises:
    computing a null space of the estimated second channel; and
    selecting a PMI closest to the null space by referring to a codebook.

13. The operation method of claim 12, further comprising:
    designing a precoding vector at the serving base station designs to enable a channel capacity of the first channel to be maximum based on the CSI and the PMI, wherein the PMI is the closest to a null space with respect to an estimated channel between the serving base station and the mobile station in the codebook, the CSI is fed back from the mobile station, and the PMI is determined by the mobile station of the adjacent cell.

14. A non-transitory computer-readable recording medium storing a program for implementing an operation method of a mobile station, the method comprising:
    estimating a first channel between a serving base station and the mobile station based on a first reference signal transmitted from the serving base station;
    estimating a second channel between the mobile station and a base station of an adjacent cell based on a second reference signal transmitted from the base station of the adjacent cell;
    determining a PMI based on the estimated second channel; and
    feeding back CSI and the PMI of the estimated first channel to at least one of the serving base station and the base station of the adjacent cell.

* * * * *